United States Patent
Rochberger et al.

(10) Patent No.: US 6,594,235 B1
(45) Date of Patent: Jul. 15, 2003

(54) METHOD OF TRIGGERING REROUTES IN AN ASYNCHRONOUS TRANSFER MODE NETWORK

(75) Inventors: Haim Rochberger, Netanya (IL); Alexander Or, Nesher (IL); Arcady Chernyak, Rosh Ha'ayin (IL); Sarit Shani Natanson, Tel Aviv (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/300,854

(22) Filed: Apr. 28, 1999

(51) Int. Cl.⁷ .......................... H04L 12/26; H04L 12/28
(52) U.S. Cl. ............. 370/238; 370/395.21; 370/395.32; 709/239
(58) Field of Search ................................. 370/216–228, 370/237–238.1, 395.1, 395.2, 395.21, 395.32; 709/239, 241

(56) References Cited

U.S. PATENT DOCUMENTS

| | | | |
|---|---|---|---|
| 4,868,814 A | 9/1989 | BerKovich et al. ........... 370/67 |
| 5,079,767 A | 1/1992 | Perlman ..................... 370/94.3 |
| 5,172,228 A | 12/1992 | Israelsen ..................... 358/133 |
| 5,291,477 A | 3/1994 | Liew ............................ 370/54 |
| 5,361,256 A | 11/1994 | Doeringer et al. ............ 370/60 |
| 5,420,862 A | 5/1995 | Perlman .................. 370/85.13 |
| 5,455,865 A | 10/1995 | Perlman ........................ 380/49 |
| 5,483,536 A | 1/1996 | Gunji et al. ............. 370/85.14 |
| 5,491,690 A | 2/1996 | Alfonsi et al. ................ 370/60 |
| 5,495,479 A | 2/1996 | Galaand et al. ............... 370/60 |
| 5,544,327 A | 8/1996 | Dan et al. .................... 395/250 |
| 5,550,818 A | 8/1996 | Brackett et al. .............. 370/60 |
| 5,566,014 A | 10/1996 | Glance ........................ 359/124 |
| 5,590,118 A | 12/1996 | Nederlof ..................... 370/218 |
| 5,600,638 A | 2/1997 | Bertin et al. ................. 370/351 |
| 5,603,029 A | 2/1997 | Aman et al. ................. 395/675 |
| 5,629,930 A | 5/1997 | Beshai et al. ................ 370/396 |
| 5,649,108 A | 7/1997 | Spiegel et al. ......... 395/200.12 |
| 5,673,263 A | 9/1997 | Basso et al. ................. 370/396 |
| 5,831,975 A | 11/1998 | Chen et al. .................. 370/256 |
| 6,111,881 A * | 8/2000 | Soncodi .................. 370/395.32 |
| 6,236,642 B1 * | 5/2001 | Shaffer et al. ............... 370/238 |

OTHER PUBLICATIONS

Perlman, R., "Interconnections: Bridges and Routers", Addison–Wesley Publishing, Section 9.2.4, Chapter 9, pp. 205–264 (1992).

Sedgewick, R., "Algorithms", Second Edition, Addison–Wesley Publishing, Chapter 17, pp. 245–257 (1988).

Doeringer, W. et al., "Routing on Longest–Matching Prefixes", *IEEE/ACM Transactions on Networking*, vol. 4, No. 1, Feb. 1996, pp. 86–97.

Williams, K. A., "A Distributed ATM Network Based on an Optical Passive Star", printed from website http://williams.cs.ncat.edu/ATMStar.htm, 2 pages, (1998).

"All–optical ATM–Switch based on Self–Electro–optic Effect Devices (SEED's)", printed from website http://www.stw.nl/projecten/T/tel3997.html, 2 pages, Feb. 2, 1997.

"ATM Forum PNNI Reroute Document LTD–CS–PNNI–Reroute Version 1.05", ATM Forum Technical Committee, Feb. 1998, pp. 22–30.

* cited by examiner

*Primary Examiner*—Steven Nguyen
(74) *Attorney, Agent, or Firm*—Howard Zaretsky

(57) ABSTRACT

A method of triggering reroutes in an ATM network based on a call optimization value being reduced beyond a predefined threshold. The method utilizes a signaling element in the SETUP message called a PNNI optimization reservation signaling element that includes an optimization type, value and percentage. A switch accumulates the optimization value and passes this value to the next node along the path. In addition, the hardware in the node is configured to measure and monitor the optimization value. The optimization value is monitored for changes that exceed the predefined optimization percentage. When this is detected, the software calculates a reroute. If the new route is better than the current route and is within the optimization percentage constraints, a reroute is performed using the newly calculated route. The reroute procedure provided by the ATM Forum can be used to implement the reroute.

19 Claims, 5 Drawing Sheets

METHOD OF TRIGGERING REROUTES IN AN ASYNCHRONOUS TRANSFER MODE NETWORK

FIELD OF THE INVENTION

The present invention relates generally to data communications networks and more particularly relates to a method for triggering reroutes in an Asynchronous Transfer Mode (ATM) network when a predetermined call optimization is reduced by a predefined amount.

BACKGROUND OF THE INVENTION

Asynchronous Transfer Mode

Currently, there is a growing trend to make Asynchronous Transfer Mode (ATM) networking technology the base of future global communications. ATM has already been adopted as a standard for broadband communications by the International Telecommunications Union (ITU) and by the ATM Forum, a networking industry consortium.

ATM originated as a telecommunication concept defined by the Comite Consulatif International Telegraphique et Telephonique (CCITT), now known as the ITU, and the American National Standards Institute (ANSI) for carrying user traffic on any User to Network Interface (UNI) and to facilitate multimedia networking between high speed devices at multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables bandwidth to be dedicated for each application, overcoming the problems that exist in a shared media networking technology, like Ethernet, Token Ring and Fiber Distributed Data Interface (FDDI). ATM allows different types of physical layer technology to share the same higher layer—the ATM layer.

ATM uses very short, fixed length packets called cells. The first five bytes, called the header, of each cell contain the information necessary to deliver the cell to its destination. The cell header also provides the network with the ability to implement congestion control and traffic management mechanisms. The fixed length cells offer smaller and more predictable switching delays as cell switching is less complex than variable length packet switching and can be accomplished in hardware for many cells in parallel. The cell format also allows for multi-protocol transmissions. Since ATM is protocol transparent, the various protocols can be transported at the same time. With ATM, phone, fax, video, data and other information can be transported simultaneously.

ATM is a connection oriented transport service. To access the ATM network, a station requests a virtual circuit between itself and other end stations, using the signaling protocol to the ATM switch. ATM provides the User Network Interface (UNI) which is typically used to interconnect an ATM user with an ATM switch that is managed as part of the same network.

The current standard solution for routing in a private ATM network is described in Private Network Node Interface (PNNI) Phase 0 and Phase 1 specifications published by the ATM Forum. The previous Phase 0 draft specification is referred to as Interim Inter-Switch Signaling Protocol (IISP). The goal of the PNNI specifications is to provide customers of ATM network equipment a level of multi-vendor interoperability.

PNNI Phase 1

As part of the ongoing enhancement to the ATM standard by work within the ATM Forum and other groups, the Private Network to Network Interface (PNNI) protocol Phase 1 has been developed for use between private ATM switches and between groups of private ATM switches. The PNNI specification includes two categories of protocols. The first protocol is defined for the distribution of topology information between switches and clusters of switches where the information is used to compute routing paths within the network. The main feature of the PNNI hierarchy mechanism is its ability to automatically configure itself within the networks in which the address structure reflects the topology. The PNNI topology and routing techniques are based on the well-known link state routing technique.

The second protocol is effective for signaling, i.e., the message flows used to establish point-to-point and point-to-multipoint connections across the ATM network. This protocol is based on the ATM Forum User to Network Interface (UNI) signaling with mechanisms added to support source routing, crankback and alternate routing of source SETUP requests in the case of bad connections.

With reference to the PNNI Phase 1 specifications, the PNNI hierarchy begins at the lowest level where the lowest level nodes are organized into peer groups. A logical node in the context of the lowest hierarchy level is the lowest level node. A logical node is typically denoted as simply a node. A peer group is a collection of logical nodes wherein each node within the group exchanges information with the other members of the group such that all members maintain an identical view of the group. When a logical link becomes operational, the nodes attached to it initiate and exchange information via a well known Virtual Channel Connection (VCC) used as a PNNI Routing Control Channel (RCC).

Hello messages are sent periodically by each node on this link. In this fashion the Hello protocol makes the two neighboring nodes known to each other. Each node exchanges Hello packets with its immediate neighbors to determine its neighbor's local state information. The state information includes the identity and peer group membership of the node's immediate neighbors and a status of its links to its neighbors. Each node then bundles its state information in one or more PNNI Topology State Elements (PTSEs) which are subsequently flooded throughout the peer group.

PTSEs are the smallest collection of PNNI routing information that is flooded as a unit among all logical nodes within a peer group. A node topology database consists of a collection of all PTSEs received, which represent that particular node's present view of the PNNI routing topology. In particular, the topology database provides all the information required to compute a route from the given source node to any destination address reachable in or through that routing domain.

When neighboring nodes at either end of a logical link begin initializing through the exchange of Hellos, they may conclude that they are in the same peer group. If it is concluded that they are in the same peer group, they proceed to synchronize their topology databases. Database synchronization includes the exchange of information between neighboring nodes resulting in the two nodes having identical topology databases. A topology database includes detailed topology information about the peer group in which the logical node resides in addition to more abstract topology information representing the remainder of the PNNI routing domain.

During a topology database synchronization, the nodes in question first exchange PTSE header information, i.e., they advertise the presence of PTSEs in their respective topology databases. When a node receives PTSE header information that advertises a more recent PTSE version than the one that it has already or advertises a PTSE that it does not yet have, it requests the advertised PTSE and updates its topology database with the subsequently received PTSE. If the newly initialized node connects to a peer group then the ensuing database synchronization reduces to a one way topology database copy. A link is advertised by a PTSE transmission only after the database synchronization between the respective neighboring nodes has successfully completed. In this fashion, the link state parameters are distributed to all topology databases in the peer group.

Flooding is the mechanism used for advertising links whereby PTSEs are reliably propagated node by node throughout a peer group. Flooding ensures that all nodes in a peer group maintain identical topology databases. A short description of the flooding procedure follows. PTSEs are encapsulated within PNNI Topology State Packets (PTSPs) for transmission. When a PTSP is received its component PTSEs are examined. Each PTSE is acknowledged by encapsulating information from its PTSE header within the acknowledgment packet that is sent back to the sending neighbor. If the PTSE is new or of more recent origin then the node's current copy, the PTSE is installed in the topology database and flooded to all neighboring nodes except the one from which the PTSE was received. A PTSE sent to a neighbor is periodically retransmitted until acknowledged.

Note that flooding is an ongoing activity wherein each node issues PTSPs with PTSEs that contain updated information. The PTSEs contain the topology databases and are subject to aging and get removed after a predefined duration if they are not refreshed by a new incoming PTSE. Only the node that originated a particular PTSE can re-originate that PTSE. PTSEs are reissued both periodically and on an event driven basis.

As described previously, when a node first learns about the existence of a neighboring peer node which resides in the same peer group, it initiates the database exchange process in order to synchronize its topology database with that of its neighbor's. The database exchange process involves exchanging a sequence of database summary packets that contain the identifying information of all PTSEs in a node topology database. The database summary packet performs an exchange utilizing a lock step mechanism whereby one side sends a database summary packet and the other side responds with its own database summary packet, thus acknowledging the received packet.

When a node receives a database summary packet from its neighboring peer, it first examines its topology database for the presence of each PTSE described within the packet. If the particular PTSE is not found in its topology database or if the neighboring peer has a more recent version of the PTSE then the node requests the PTSE from the particular neighboring peer or optionally from another neighboring peer whose database summary indicates that it has the most recent version of the PTSE.

A corresponding neighboring peer data structure is maintained by the nodes located on either side of the link. The neighboring peer data structure includes information required to maintain database synchronization and flooding to neighboring peers.

It is assumed that both nodes on either side of the link begin in the Neighboring Peer Down state. This is the initial state of the neighboring peer for this particular state machine. This state indicates that there are no active links through the neighboring peer. In this state, there are no adjacencies associated with the neighboring peer either. When the link reaches the point in the Hello protocol where both nodes are able to communicate with each other, the event AddPort is triggered in the corresponding neighboring peer state machine. Similarly when a link falls out of communication with both nodes the event DropPort is triggered in the corresponding neighboring peering state machine. The database exchange process commences with the event AddPort which is thus triggered but only after the first link between the two neighboring peers is up. When the DropPort event for the last link between the neighboring peers occurs, the neighboring peer state machine will internally generate the DropPort last event closing all state information for the neighboring peers to be cleared.

It is while in the Negotiating state that the first step is taken in creating an adjacency between two neighboring peer nodes. During this step it is decided which node is the master, which is the slave and it is also in this state that an initial Database Summary (DS) sequence number is decided upon. Once the negotiation has been completed, the Exchanging state is entered. In this state the node describes is topology database to the neighboring peer by sending database summary packets to it.

After the peer processes the database summary packets, the missing or updated PTSEs can then be requested. In the Exchanging state, the database summary packets contain summaries of the topology state information contained in the node's database. In the case of logical group nodes, those portions of the topology database that were originated or received at the level of the logical group node or at higher levels is included in the database summary. The PTSP and PTSE header information of each such PTSE is listed in one of the nodes database packets. PTSEs for which new instances are received after the exchanging status have been entered may not be included in any database summary packet since they will be handled by normal flooding procedures.

The incoming data base summary packet on the receive side is associated with a neighboring peer via the interface over which it was received. Each database summary packet has a database summary sequence number that is implicitly acknowledged. For each PTSE listed, the node looks up the PTSE in its database to see whether it also has an instance of that particular PTSE. If it does not or if the database copy is less recent, then the node either re-originates the newer instance of the PTSE or flushes the PTSE from the routing domain after installing it in the topology database with a remaining lifetime set accordingly.

Alternatively, if the listed PTSE has expired, the PTSP and PTSE header contents in the PTSE summary are accepted as a newer or updated PTSE with empty contents. If the PTSE is not found in the node's topology database, the particular PTSE is put on the PTSE request list so it can be requested from a neighboring peer via one or more PTSE request packets.

If the PTSE request list from a node is empty, the database synchronization is considered complete and the node moves to the Full state.

However, if the PTSE request list is not empty then the Loading state is entered once the node's last database summary packet has been sent but the PTSE request list is not empty. At this point, the node now knows which PTSE needs to be requested. The PTSE request list contains a list of those PTSEs that need to be obtained in order to synchronize that particular node's topology database with the neighboring peer's topology database. To request these PTSEs, the node sends the PTSE request packet which contains one or more entries from the PTSE request list. The PTSE request list packets are only sent during the Exchanging state and the Loading state. The node can sent a PTSE request pack to a neighboring peer and optionally to any other neighboring peers that are also in either the Exchanging state or the Loading state and whose database summary indicate that they have the missing PTSEs.

The received PTSE request packets specify a list of PTSEs that the neighboring peer wishes to receive. For each PTSE specified in the PTSE request packet, its instance is looked up in the node's topology database. The requested PTSEs are subsequently bundled into PTSPs and transmitted to the neighboring peer. Once the last PTSE and the PTSE request list has been received, the node moves from the Loading state to the Full state. Once the Full state has been reached, the node has received all PTSEs known to be available from its neighboring peer and links to the neighboring peer can now be advertised within PTSEs.

A major feature of the PNNI specification is the routing algorithm used to determine a path for a call from a source user to a destination user. The routing algorithm of PNNI is a type of link state routing algorithm whereby each node is responsible for meeting its neighbors and learning their identities. Nodes learn about each other via the flooding of PTSEs described hereinabove. Each node computes routes to each destination user using the information received via the PTSEs to form a topology database representing a view of the network.

Using the Hello protocol and related FSM of PNNI, neighboring nodes learn about each other by transmitting a special Hello message over the link. This is done on a continual periodic basis. When a node generates a new PTSE, the PTSE is flooded to the other nodes within its peer group. This permits each node to maintain an up to date view of the network.

Once the topology of the network is learned by all the nodes in the network, routes can be calculated from source to destination users. A routing algorithm commonly used to determine the optimum route from a source node to a destination node is the Dijkstra algorithm. The Dijkstra algorithm is used to generate the Designated Transit List which is the routing list used by each node along the path during the setup phase of the call. Used in the algorithm are the topology database (link state database) which includes the PTSEs received from each node, a Path List comprising a list of nodes for which the best path from the source node has been found and a Tentative List comprising a list of nodes that are only possibly the best paths. Once it is determined that a path is in fact the best possible, the node is moved from the Tentative List to the Path List.

The algorithm begins with the source node (self) as the root of a tree by placing the source node ID onto the Path List. Next, for each node N placed in the Path List, N's nearest neighbors are examined. For each neighbor M, the cost of the path from the root to N is added to the cost of the link from N to M. If M is not already in the Path List or the Tentative List having a better path cost, M is added to the Tentative List.

If the Tentative List is empty, the algorithm terminates. Otherwise, the entry in the Tentative List with the minimum cost is found. That entry is then moved to the Path List and the examination step described above is repeated.

PNNI Optimization

In an ATM network that utilizes PNNI for routing, it is normally the practice that the selection between a plurality of routes when establishing a call between two users is based upon an optimization metric, attribute and/or parameter. Associated with each call, are two elements. One element is the call constraints and the second element is the specific metric, attribute or parameter used to select the route. The call constraints are the basic call requirements that must be fulfilled. If the network cannot find a route that fulfills the basic call constraints, the call is rejected. Even when the network does find a route that satisfies the constraints, the selection between all possible routes that satisfy the constraints are selected using a specific metric, attribute and/or parameter.

Today, in ATM networks using currently available switching equipment, at the time a all is established, the network configures an optimum route that meets the requirements specified by the call originator. It cannot, however, guarantee that the optimization quality achieved at the time the call was established will remain indefinitely. In other words, the path chosen at the time the call was established may, in time, no longer be the optimal path.

After a call is established and active, users are likely to get used to a specific optimization, i.e., a short call delay or fast data rate. Such users will likely prefer to maintain the optimization and not have it degrade over time, even if any degradation still leaves the call within the original call constraints.

For example, consider a video application that is optimized on cell delay. At the time the call was established, the call met the constraints and was optimum. Over time, however, users likely got used to using a connection having certain delay, rate, etc. These users would prefer to maintain their connection having good delay and data rate that was provided at the time the call was established, even if after the connection degrades, the call is still within the original constraints.

SUMMARY OF THE INVENTION

The present invention is a method of triggering reroutes in an ATM network based on a call optimization value being reduced beyond a predefined threshold. The method requires that switches in the network support the PNNI edge based rerouting feature for point to point connections. The soft reroute triggering method of the present invention assumes that (1) at least the end node switches on the call path support the feature of the present invention; (2) the two end node switches support the PNNI reroute feature as defined by the ATM Forum; and (3) the nodes that do not support the feature of the present invention, i.e., do not understand the signaling parameters associated therewith, will forward the signaling parameters using the 'pass along' feature of the PNNI specification (i.e. the signaling parameters are designated as 'mandatory').

Note that the invention will work even if some of the nodes along the call path do not support the feature of the present invention. It is a requirement for the present invention to work, however, that the two end nodes support the reroute feature of the invention.

The method utilizes a signaling element in the SETUP message that is termed a PNNI optimization reservation signaling element. The signaling element includes an optimization type, value and percentage. This signaling element is transferred within the SETUP message from node to node along the path. When receiving the signaling element, a switch accumulates the optimization value and passes this value to the next node along the path. In addition, the hardware in the originating node is configured to measure and monitor the optimization value. The optimization value is monitored for changes that exceed the predefined optimization percentage. A change in state is detected if the optimization value exceeds the optimization percentage or if the optimization value is again within the optimization percentage. If a change in state in either direction is detected, a software trap is generated.

The software, upon receiving a trap from the hardware, waits a random period of time. If no trap is received during this time, i.e., the optimization value is still outside the optimization percentage, a new route is calculated and compared with the existing route. If it is better and is within the optimization percentage constraints, a reroute is performed using the newly calculated route. The reroute procedure provided by the ATM Forum can be used to implement the reroute.

If the new route is not better than the current route or is not within the optimization percentage constraints, the software waits a random timeout period and a new reroute calculation is attempted. The process repeats until a new route is found that meets the requirements or until a trap is received indicating that the optimization value is within the optimization percentage.

As a result of the application of the method of the present invention to the nodes in a network, once the user establishes a call with a specific quality of service the network attempts, using the available resources, to ensure that the call does not experience degradation after it is established.

There is provided in accordance with the present invention, in an Asynchronous Transfer Mode (ATM) network including a source user, source node, destination user, destination node and a plurality of intermediate nodes, a method of triggering the rerouting of a previously established call connection between the source user and the destination user, the method comprising the steps of generating a SETUP message containing an optimization reservation signaling element including an optimization type, optimization value and an optimization percentage, the source node performing a route calculation and sending a SETUP message containing the signaling element with appropriate values for the optimization type, the optimization value and the optimization percentage along a routing path, accumulating the optimization value at each node along the path, configuring the source node and the destination node on the path to measure the optimization value and to detect when a change of state occurs whereby the optimization value either exceeds the optimization percentage or falls therewithin, calculating a reroute when the optimization value exceeds the optimization percentage and performing the reroute if the reroute is better then the current route and is within the original optimization percentage.

The step of accumulating the optimization value comprises the steps of examining the Designated Transit List (DTL) within the peer group of the current node for the previous node that supports the reroute method and accumulating the optimization value for those previous nodes that do not support the reroute method. The step of detecting when a change of state occurs comprises the step of generating a software trap. The method further comprises the step of selecting a random timeout period when the optimization value exceeds the optimization percentage and waiting for the timeout period to expire.

The random timeout period is in the range of 0 to 30 seconds. The method further comprises the steps of selecting a random timeout period when the reroute calculation fails to generate a route that is within the original optimization percentage and better than the current route and calculating a new reroute when the timeout period expires. In addition, the reroute is performed in accordance with the reroute procedure specified by the ATM Forum. The method further comprises the step of terminating the reroute if it is detected that a change of state occurred whereby the optimization value falls within the optimization percentage.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
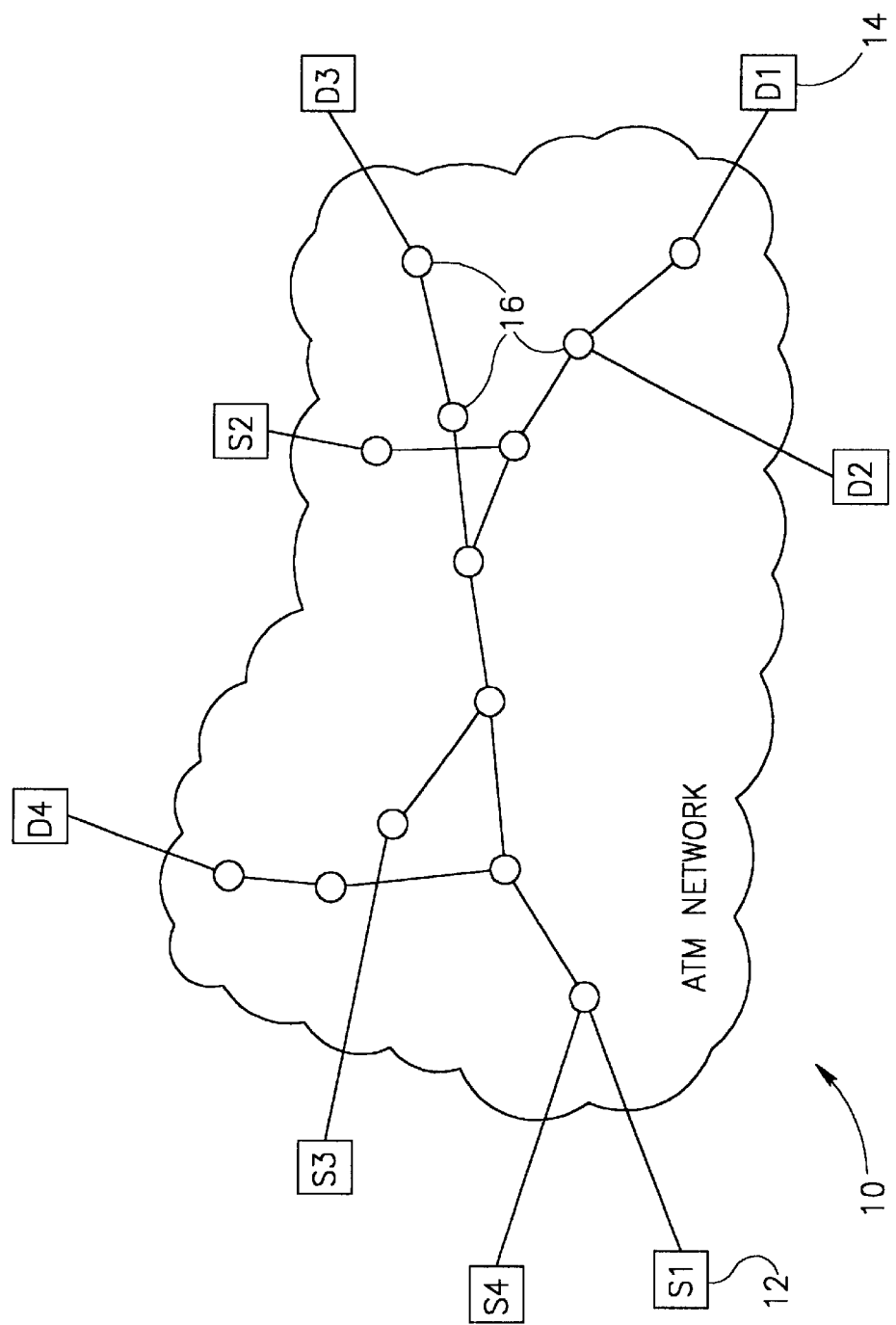
FIG. 1 is a block diagram illustrating an example ATM network having a plurality of source and destination users.

The following notation is used throughout this document.

| Term | Definition |
| --- | --- |
| ACR | Available Cell Rate |
| AESA | ATM End System Address |
| AINI | ATM Inter Network Interface |
| ANSI | American National Standards Institute |
| ATM | Asynchronous Transfer Mode |
| CCITT | Comite Consulatif International Telegraphique et Telephonique |
| CDV | Cell Delay Variation |
| CTD | Cell Transfer Delay |
| DS | Database Summary |
| DTL | Designated Transit List |
| FDDI | Fiber Distributed Data Interface |
| FSM | Finite State Machine |
| IE | Information Element |
| IISP | Interim Inter-Switch Signaling Protocol |
| ITU | International Telecommunications Union |
| NCCI | Network Connection Correlation Identifier |
| PCR | Peak Cell Rate |
| PNNI | Private Network to Network Interface |
| PTSE | PNNI Topology State Element |
| PTSP | PNNI Topology State Packet |
| PVC | Permanent Virtual Circuit |
| PVP | Permanent Virtual Path |
| QoS | Quality of Service |
| RCC | Routing Control Channel |
| SVC | Switched Virtual Circuit |
| SVP | Switched Virtual Path |
| UNI | User to Network Interface |
| VCC | Virtual Channel Connection |

The present invention is a method of triggering reroutes in an ATM network based on a call optimization value being reduced beyond a predefined threshold. The method requires that switches in the network support the PNNI edge based rerouting feature for point to point connections which is described in detail in an ATM Forum PNNI Reroute Document LTD-CS-PNNI-Reroute Version 1.05, February 1998, incorporated herein by reference. A brief description of edge based rerouting is presented below.

PNNI Edge Based Rerouting

Edge based rerouting is a rerouting mechanism which is designed to replace a connection segment within a PNNI network starting from the source node, i.e., DTL originator, and ending at the destination node, i.e., DTL terminator, for SVC, SVP, soft PVC and soft PVP. There are two approaches to perform edge based rerouting. One approach is 'break-before-make' and the other approach is 'make-before-break.' They are also referred to as 'hard reroute' and 'soft reroute,' respectively. The design of 'break-before-make' reroute procedures can be used for connection recovery or priority control features. To implement other types of rerouting features such as path optimization and administrative rerouting etc., rerouting procedures for 'make-before-break' are required.

For edge based rerouting, the DTL originator (rerouting node) and the DTL terminator (rendezvous node) participate in the call control of a rerouting operation. The rerouting procedure specified in the ATM Forum reference provides for a rerouting state machine to run at each end of a connection segment to coordinate the protocol handshake. This provides a simple solution to handle the possible collision between the 'break-before-make' and 'make-before-break' types of rerouting. In order to simplify the rerouting procedures, only one rerouting operation is permitted to be executed in a switch for a call/connection at any one time. For each call, the rerouting state machine is operating in parallel with the call/connection state machine at the edges of a PNNI network. Therefore, in some cases when a switch is performing a 'make-before-break' type of rerouting, up to three state machines may be running simultaneously to reroute a call, e.g., two call/connection state machines (i.e. one for the incumbent connection and one for the rerouting connection), and one rerouting machine.

In order to identify the connection at the rendezvous node during the rerouting for re-connection so that the end-to-end traffic flow can be resumed, a unique connection identifier is required. The rerouting feature uses the Network Call Correlation Identifier (NCCI) for this purpose.

A rerouting information element is used to exchange information between the two edge switches that take part in the rerouting mechanism, i.e., the rerouting node and the rendezvous node. This information element comprises information to initialize and control the rerouting mechanism. The rerouting information element is present in both the SETUP and CONNECT messages during both the initial connection establishment and the rerouting connection establishment. The content of the rerouting information element depends on the context in which it is used. Since the rerouting information element is used to exchange information between the two edge switches, it is only specified for PNNI interfaces, however, the intermediate nodes within the PNNI network are not required to recognize nor support this information element. The intermediate nodes shall, however, transparently transport this IE across the network. To allow a PNNI network, which has a mix of PNNI Version 1.0 switches where some support and some do not support rerouting, the rerouting node and the rendezvous node shall enable the 'Pass Along Request' handling directive in order to be backward compatible with PNNI Version 1.0 switches.

If, however, the call/connection spans across multiple networks, the use of the 'Pass Along Request' handling directive could interfere with the proper synchronization between the two edge switches within a network domain when initializing the rerouting operation. As a result, a mechanism is needed by the two edge switches to identify the support of the rerouting operation within the same network domain. The PNNI edge switches insert or discard the information for this EE. The rerouting node removes this IE prior to exiting the ingress edge switch which is connected to the UNI or AINI in the direction of the calling party when processing the CONNECT message. Similarly, the rendezvous node removes this IE prior to exiting the egress edge switch which is connected to the UNI or AINI in the direction of the called party when processing the SETUP message.

The rerouting information element when inserted in the SETUP message of the initial connection allows the rerouting node to inform its corresponding rendezvous node peer, i.e., within the same network domain, that it supports the rerouting mechanism. The rerouting information element contains the level and the AESA of the rerouting node that is internally reachable and is advertised with global scope. Upon receiving the rerouting information element, the rendezvous node is able to recognize whether the given AESA is corresponding to the same network domain or not.

The rerouting information element when inserted in the CONNECT message of the initial connection informs the rerouting node that its corresponding rendezvous node supports the rerouting mechanism and carries the rendezvous node related information back to the rerouting node. To allow the rerouting node to establish the new connection path with the rendezvous node, the AESA of the rendezvous node, which is internally reachable with global scope, and the level at which the node is active are both used. In case of edge-to-edge rerouting, the level of the rendezvous node is always set to zero, i.e., the highest scope.

Soft Reroute Triggering

The soft reroute triggering method of the present invention assumes that (1) the two end node switches on the call path support the feature of the present invention; (2) the two end node switches support the PNNI reroute feature as defined by the ATM Forum; and (3) the nodes that do not support the feature of the present invention, i.e., do not understand the signaling parameters associated therewith, will forward the signaling parameters using the 'pass along' feature of the PNNI specification (i.e. the signaling parameters are designated as 'mandatory'). Note that it is a requirement of the present invention that the two end nodes support the feature of the invention.

A block diagram illustrating an example ATM network having a plurality of source and destination users is shown in FIG. 1. The ATM network, generally referenced 10, comprises a plurality of nodes 16. A plurality of source users 12, labeled S1, S2, S3, S4 are connected to source nodes in the network. A plurality of destination users 14, labeled D1, D2, D3, D4 are connected to destination nodes in the network. The network 10 comprises additional nodes other than those shown explicitly in FIG. 1. A route is established from each source user to a destination user. In particular, a connection is made between source user S1 and destination user DI, between source user S2 and destination user D2, between source user S3 and destination user D3 and between source user S4 and destination user D4. It is important to note that some of the links and nodes are shared for a portion of the routes.

As mentioned previously, the existing routes between source and destination user were optimal at the time the calls were originally established. Over time, however, these routes may not remain optimal. Take for example, the routes established in FIG. 1. Originally, the first route established is between S1 and D1. At the time this route was established, no other connections existed. Users experienced excellent delay and data rates. Over time, a connection between S2 and D2 was established. The routes connecting S1 to D1 and S2 to D2 share two nodes and a link. The resources originally available to the S1–D1 route are now shared with the S2–D2 route. Consequently, the original users may experience a drop in performance. The situation worsens as connections between S3–D3 and S4–D4 are made. This results in inefficient utilization of the network. The original S1–D1 connection, if routed at this point in time, will likely achieve better performance as the route would utilize unused portions of the network 10.

The present invention provides a means for detecting, based on an optimization metric, attribute or parameter, when a route falls out of optimization and, in consequence thereof, triggering a reroute. The reroute is performed only if the new route is more optimal than the current route.

Figure 2:
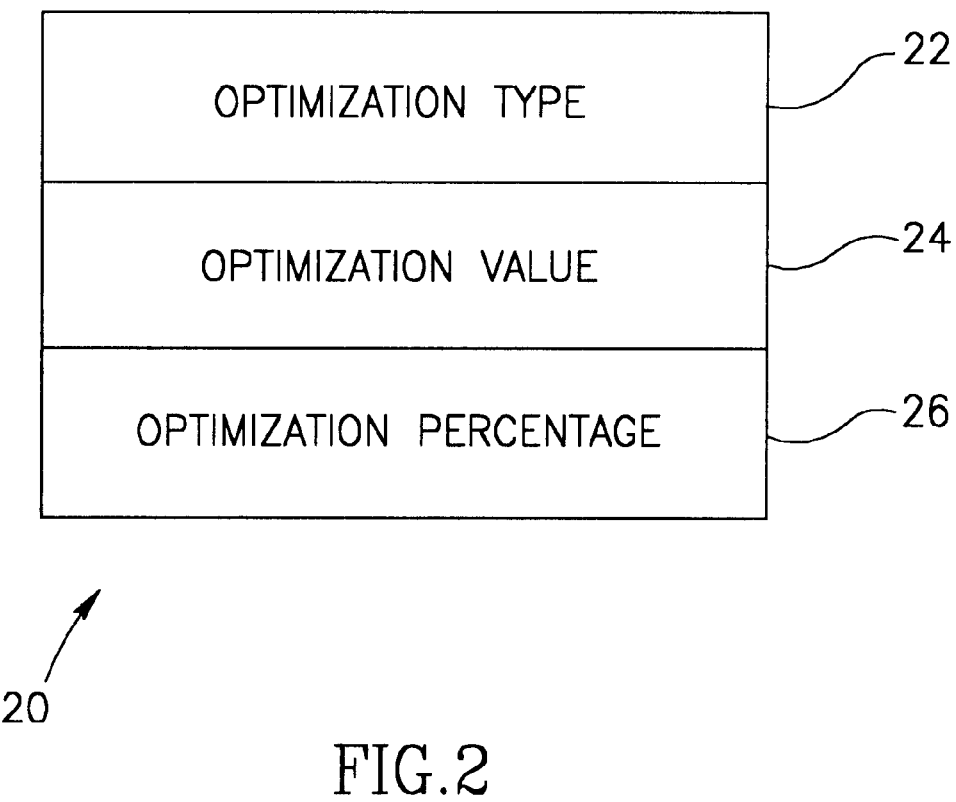
FIG. 2 is a diagram illustrating the PNNI optimization reservation signaling element of the present invention.

The method of the present invention utilizes a signaling element termed a PNNI optimization reservation. The parameter is optional and appears in the SETUP and CONNECT messages. A diagram illustrating the PNNI optimization reservation signaling element of the present invention is shown in FIG. 2. The signaling element, generally referenced 20, comprises three fields. The first field comprises an optimization type 22 that represents the type of optimization to be used, i.e., metric, attribute or parameter. The type field can comprise a number which is associated with particular metric, attribute or parameter the determination to perform a reroute will optimize on. Examples of the optimization type include, but are not limited to, Cell Delay Variation (CDV), Available Cell Rate (ACR), Cell Transfer Delay (CTD), Peak Cell Rate (PCR), etc.

The second field comprises an optimization value 24 that is the accumulated metric/attribute/parameter associated with the optimization type. Each node along the route that supports the feature adds the local value of that metric/attribute/parameter to the optimization value. Note that the requested metric/attribute/parameter value was previously specified in connection with the original SETUP request message. For example, if the optimization type is cell delay, the optimization value may be 0.5. Note, however, that the requested delay, i.e., the call constraint, may have been 2.0. Thus, the route is within the constraint but may or may not be within the optimization percentage.

The third field comprises an optimization percentage 26. This field represents the tolerance expressed as a percentage or other equivalent form that the route will accept for the optimization value before a reroute will be triggered. As long as the optimization value remains within the optimization percentage, a reroute will not be attempted. The optimization percentage is typically set by a network manager, but does not have to be. It is preferable for the percentage to be set to the same value per class of service, i.e., to be uniform for a particular QoS. Note that the percentage may be any positive number and is not necessarily limited to 100, i.e., the percentage may be 200, 300%, etc.

In addition, the hardware in the switch that is to support the feature of the invention is modified to measure the optimization value and to detect whether it is within or outside of the optimization percentage. In response to the optimization value exceeding the optimization percentage, the hardware is adapted to generate a software trap, i.e., software interrupt, notifying the signaling or monitoring software that a change in state has occurred, i.e., that the optimization value is no longer within the optimization percentage. Likewise, the hardware is adapted to generate a software trap notifying the signaling or monitoring software that a change in state has occurred in the reverse direction, i.e., that the optimization value is now within the optimization percentage.

Note that the measurement of the optimization value and the comparison to the optimization percentage is on a link by link basis for a specific metric, attribute or parameter. Note that the optimization percentage is typically predefined but is not required to be. As an example, if the cell delay (optimization value) is 0.5 and the optimization percentage is set to 100%, then when the delay exceeds 1.0 a reroute will be triggered.

The modifications required to the hardware likely depend on the optimization type. For example, cell delay determination may be measured differently then data rate. Regardless of the optimization type, it is known to one skilled in the networking art how to modify an existing switch to perform the optimization value monitoring and to generate a software trap whenever a change in state occurs from the value being within or outside the optimization percentage.

Figure 3:
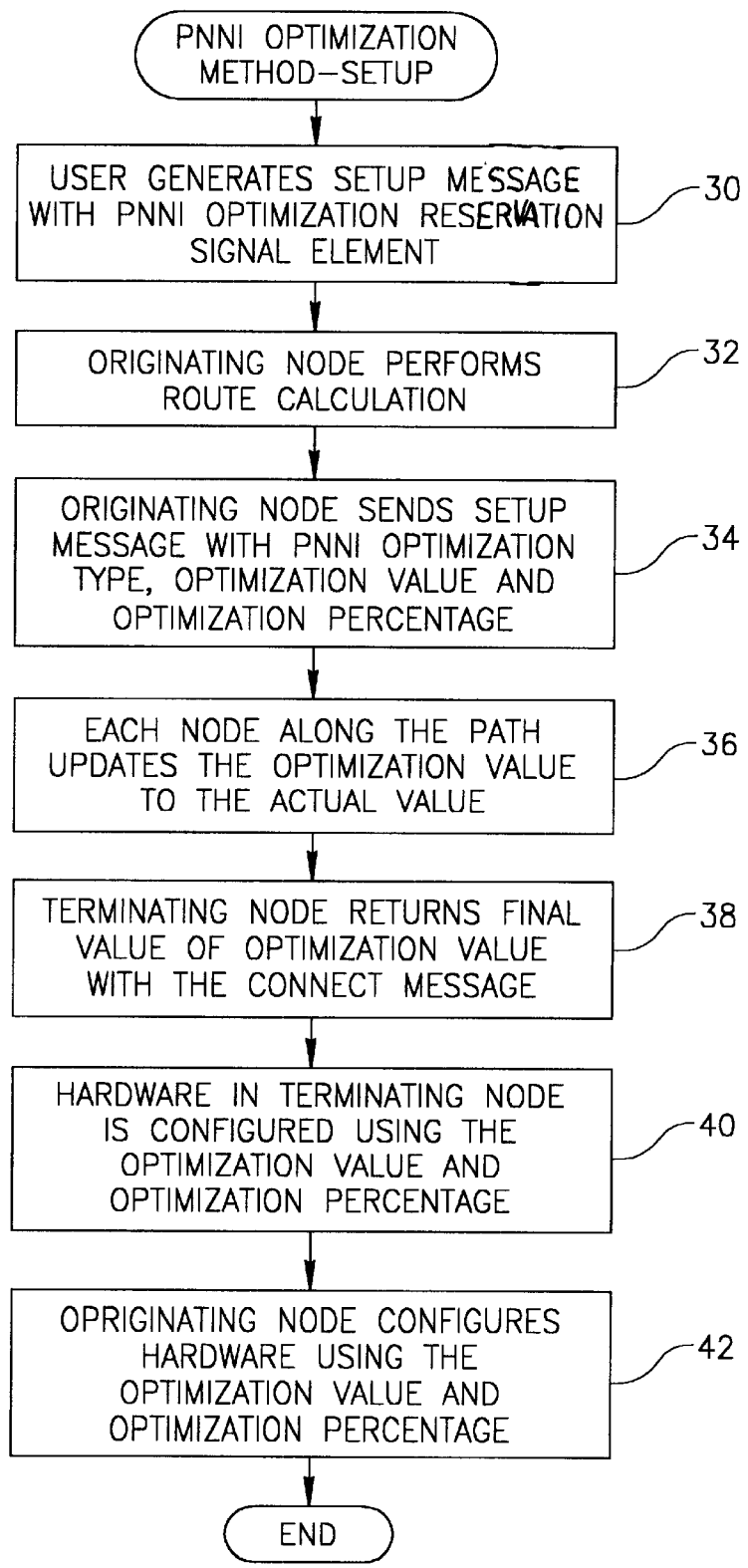
FIG. 3 is a flow diagram illustrating the setup portion of the PNNI optimization method of the present invention.

A flow diagram illustrating the setup portion of the PNNI optimization method of the present invention is shown in FIG. 3. It is important to note that the feature may be configured either manually by a network manager or automatically via the network switch. A user who desires to utilize the reroute feature of the present invention generates and sends a SETUP message comprising the PNNI optimization reservation signaling element to the source node (step 30).

The originating node (i.e. source node) directly attached to the source user performs a route calculation upon receiving a SETUP message (step 32). Once a route is found and if the SETUP message received contains the PNNI optimization reservation signaling element, the source node generates and sends a SETUP message containing the optimization signaling element to the first node on the path (step 34). The signaling element comprises appropriate values for the optimization type, value and percentage. Note that the optimization value is an accumulated value that each node along the path modifies if it supports the feature of the present invention.

Each node along the path that supports the feature of the invention functions to update the value in the optimization value field to the actual value measured at that particular node (step 36).

The terminating node (i.e. destination node attached to the destination user) returns the optimization value set to the final value to the source user when it receives the CONNECT message from the terminating user (step 38). The final value is returned to the source user via the CONNECT message. At this time, the hardware is configured to measure the optimization value and monitor the value for changes that cause a change of state either into or out of the percentage range, i.e., the value plus or minus the optimization percentage (step 40).

After receiving the CONNECT message, the originating node configures its hardware using the optimization value and the optimization percentage (step 42). The hardware in both the originating and terminating node is configured to measure the optimization value and monitor the value for changes that cause a change of state either into or out of the optimization percentage range, i.e., the value plus or minus the optimization percentage. For example, consider a connection with a constraint for delay of 10 ms. The first node has 1 ms delay and sets the optimization value to 1 ms. The second node along the path has a delay of 2 ms and accumulates the optimization value to 3 ms. In this fashion, each node along the path sets the value accordingly.

Figure 4:
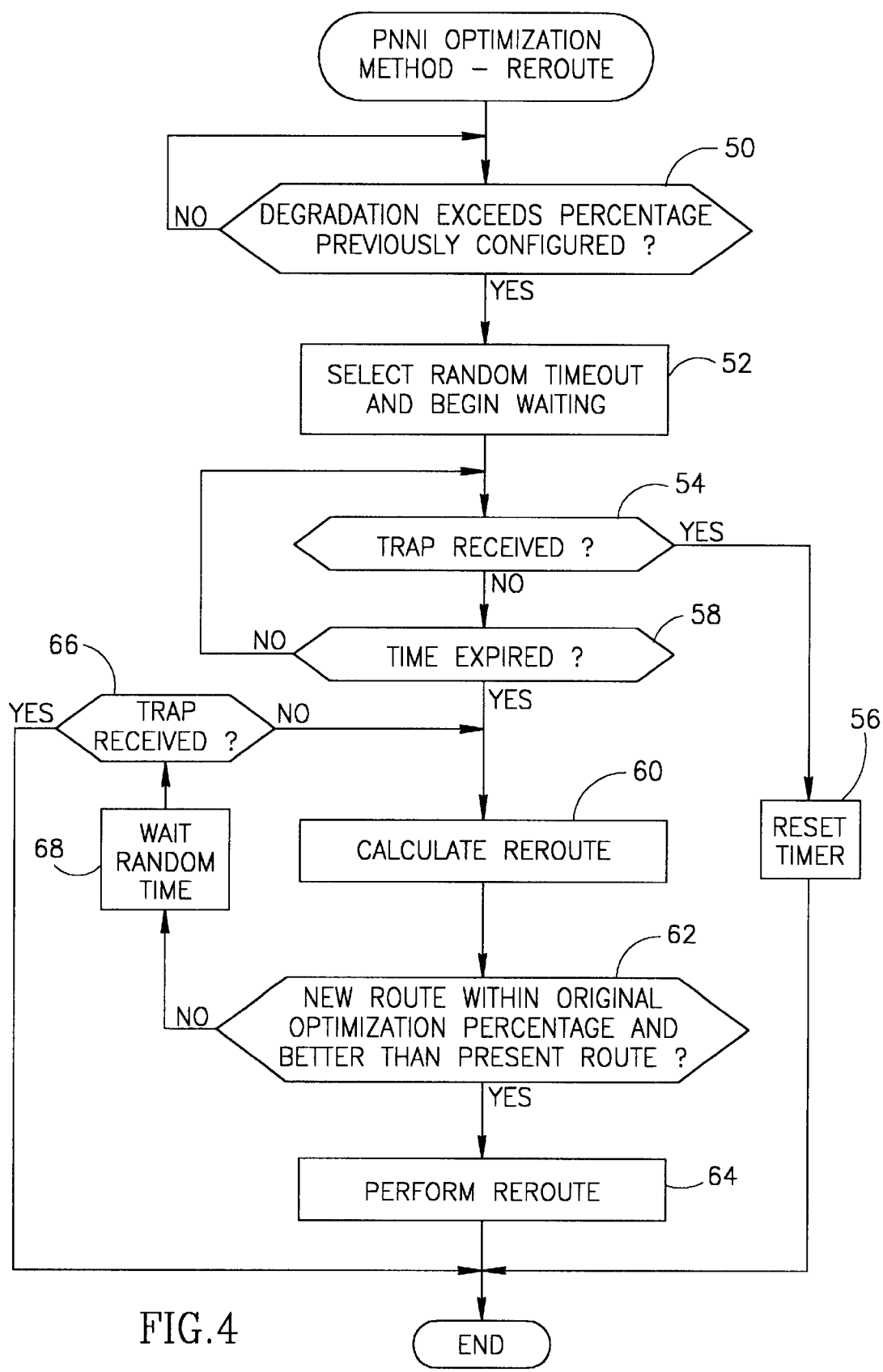
FIG. 4 is a flow diagram illustrating the reroute portion of the PNNI optimization method of the present invention.

A flow diagram illustrating the reroute portion of the PNNI optimization method of the present invention is shown in FIG. 4. Once the hardware in a switch is configured, the switch continually measures and monitors the optimization type for changes into or out of the optimization percentage.

If a degradation is detected (optimization value worsens, e.g., delay increases) that exceeds the optimization percentage configured previously then a trap is generated and passed to the software in the switch (step 50). The software then selects a random timeout period and begins waiting for the timeout to expire (step 52). The timeout period can be any time period but is preferably within the range of 0 to 30 seconds.

During the timeout period, a trap may be received. If a trap is received (step 54), it means the optimization value has fallen back within the optimization percentage and a reroute does not need to be performed. In this case, the timer is reset (step 56) and the method ends.

If a trap is not received (step 54) during the timeout period, and the timeout has expired (step 58), a reroute is calculated (step 60). The new route is then compared with the current route. If the new route is within the original optimization percentage and better than the present route (step 62), a reroute is performed using the new route just calculated (step 64). Note that the new route calculated may be within the original call constraints but outside the optimization percentage range. Note also that the reroute is performed using the reroute procedure as defined by the ATM Forum in the LTD-CS-PNNI-Reroute Version 1.05 document.

If the new route is either not within the original optimization percentage or is not better than the present route (step 62) then the software waits a random period of time (step 68). The random period of time is preferably chosen within the range of 1 to 10 minutes. Note that if a trap is received at any time during this second timeout period (step 66), the timeout resets and the method terminates. After the timeout expires and no trap was received, a new route that ideally comprises better values is calculated again (step 60) and this new route is compared to the present route and the optimization percentage (step 62).

Note that the two timers used in steps 52 and 68 are intentionally set to random values in order to prevent oscillations. If a switch used the same timeout value each time, an oscillation condition may be created whereby calls will reroute together from one side of the network to the other.

Use of the reroute method of the present invention thus provides for a network that attempts to continually maintain balance. Users continue to receive benefits from the network in terms of performance during the entire time period a call connection exists and not just at the time (and shortly thereafter) the call was originally established.

Figure 5:
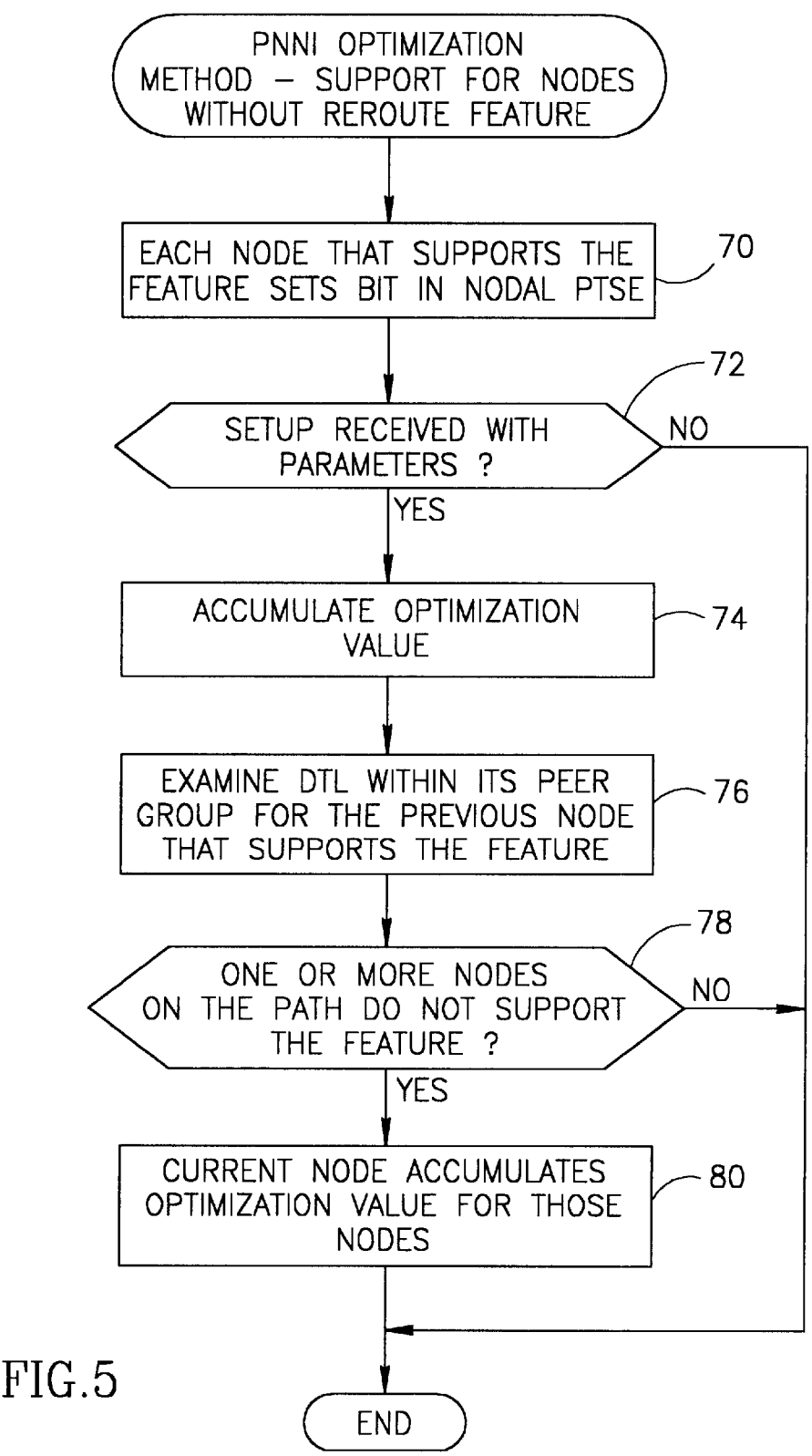
FIG. 5 is a flow diagram illustrating the method for providing support for nodes that do not support the feature of the present invention.

A flow diagram illustrating the method for providing support for nodes that do not support the feature of the present invention is shown in FIG. 5. The following method provides support for nodes in the network that do not support the method of the present invention. Setting a bit in the nodal PTSE can provide indication of whether a node supports the feature of the invention.

Each node that supports the reroute feature of the present invention sets a bit in its nodal information PTSE as an indication (step 70). The node then advertises the nodal information PTSE to other nodes in the network. When a SETUP message is received by a node that supports the reroute feature, the node checks whether the message contains a PNNI optimization reservation signaling element (step 72). If it does not, the setup procedure continues normally and the method terminates.

If the SETUP message does include the optimization signaling element, the node accumulates the value of the local optimization type to the optimization value field of the signaling element (step 74). The node then tracks backwards along the DTL within the boundary of its PNNI peer group for the previous node on the DTL that supports the reroute feature of the present invention (step 76). It can be determined whether a node supports the reroute feature by examining the bit in the nodal information PTSE.

If the previous node on the DTL does support the reroute feature (step 78) then the SETUP procedure proceeds as normal and the method terminates. If, however, one or more previous nodes on the DTL do not support the reroute feature then the current node accumulates the optimization values for those nodes utilizing the PTSEs corresponding thereto (step 80).

It is important to point out that some of the middle nodes in a peer group not supporting the reroute feature does not effect the operation of the invention since the optimization value in each SETUP message that enters a peer group is assured of being accumulated. Note, however, at a minimum, the border nodes in a peer group must support the reroute feature of the present invention. It is not a requirement, however, that the nodes within the peer group other than the border nodes support the reroute feature.

As a result of the application of the method of the present invention to the nodes in a network, once the user establishes a call with a specific quality of service the network attempts, using the available resources, to ensure that the call does not experience degradation after it is established.

While the invention has been described with respect to a limited number of embodiments, it will be appreciated that many variations, modifications and other applications of the invention may be made.

What is claimed is:

1. In an Asynchronous Transfer Mode (ATM) network including a source user, source node, destination user, destination node and zero or more intermediate nodes, a method of triggering the path rerouting of a previously established call connection between said source user and said destination user, said method comprising the steps of:

generating a first SETUP message comprising an optimization type, optimization value and an optimization percentage;

said source node performing a route calculation and sending a second SETUP message comprising appropriate values for said optimization type, said optimization value and said optimization percentage along a routing path;

accumulating said optimization value at each node along said routing path;

configuring said source node and said destination node on said routing path to measure said optimization value and to detect when a change of state occurs whereby said optimization value either exceeds said optimization percentage or falls therewithin;

calculating a path reroute when said optimization value exceeds said optimization percentage; and performing said path reroute if said path reroute is better than a current path route and is within said optimization percentage.

2. The method according to claim 1, wherein said step of accumulating said optimization value comprises the steps of:

examining a Designated Transit List (DTL) within the peer group of the current node for the previous node that supports said method of triggering path rerouting; and accumulating the optimization value for those previous nodes that do not support said method of triggering path rerouting.

3. The method according to claim 1, wherein said step of detecting when a change of state occurs comprises the step of generating a software trap.

4. The method according to claim 1, further comprising the step of selecting a random timeout period when said optimization value exceeds said optimization percentage and waiting for said timeout period to expire.

5. The method according to claim 4, wherein said random timeout period is in the range of 0 to 30 seconds.

6. The method according to claim 1, further comprising the steps of:
  selecting a random timeout period when said reroute calculation fails to generate a path route that is within said optimization percentage and better than the current route; and
  calculating a new path reroute when said timeout period expires.

7. The method according to claim 1, wherein said step of performing said path reroute comprises the step of performing edge based path rerouting.

8. The method according to claim 1, further comprising the step of terminating said path reroute if it is detected that a change of state occurred whereby said optimization value falls within said optimization percentage.

9. The method according to claim 1, wherein said optimization type, said optimization value and said optimization percentage are transmitted within an optimization reservation signaling element.

10. The method according to claim 1, wherein said optimization type, said optimization value and said optimization percentage are transmitted within a Private Network to Network Interface (PNNI) based optimization reservation signaling element.

11. The method according to claim 1, wherein said step of configuring comprises the step of said destination node returning said optimization value set to a final value to said source user via a CONNECT message.

12. An apparatus for triggering the path rerouting of a previously established call connection between a source user and a destination user in an Asynchronous Transfer Mode (ATM) network including a source user, source node, destination user, destination node and zero or more intermediate nodes, comprising:
  means for generating a first SETUP message comprising an optimization type, optimization value and an optimization percentage;
  means for said source node performing a route calculation and sending a second SETUP message comprising appropriate values for said optimization type, said optimization value and said optimization percentage along a routing path;
  means for accumulating said optimization value at each node along said routing path;
  means for configuring said source node and said destination node on said routing path to measure said optimization value and to detect when a change of state occurs whereby said optimization value either exceeds said optimization percentage or falls therewithin;
  means for calculating a path reroute when said optimization value exceeds said optimization percentage; and
  means for performing said path reroute if said path reroute is better than a current path route and is within said optimization percentage.

13. The apparatus according to claim 12, wherein said means for accumulating said optimization value comprises:
  means for examining a Designated Transit List (DTL) within the peer group of the current node for the previous node that supports said method of triggering path rerouting; and
  means for accumulating the optimization value for those previous nodes that do not comprise said apparatus for triggering path rerouting.

14. The apparatus according to claim 12, wherein said means for detecting when a change of state occurs comprises means for generating a software trap.

15. The apparatus according to claim 12, further comprising means for selecting a random timeout period when said optimization value exceeds said optimization percentage and waiting for said timeout period to expire.

16. The apparatus according to claim 15, wherein said random timeout period is in the range of 0 to 30 seconds.

17. The apparatus according to claim 12, further comprising:
  means for selecting a random timeout period when said reroute calculation fails to generate a path route that is within said optimization percentage and better than the current route; and
  means for calculating a new path reroute when said timeout period expires.

18. The apparatus according to claim 12, wherein said means for performing said path reroute comprises means for performing edge based path rerouting.

19. The apparatus according to claim 12, further comprising means for terminating said path reroute if it is detected that a change of state occurred whereby said optimization value falls within said optimization percentage.

* * * * *